United States Patent [19]

Katayama et al.

[11] Patent Number: 4,987,874
[45] Date of Patent: Jan. 29, 1991

[54] CONTROL SYSTEM FOR CONTROLLING SPARK TIMING OF ENGINE

[75] Inventors: Kenji Katayama; Tatsuji Ikeda; Toshio Takeda; Tomoichirou Shimada, all of Hiroshima, Japan

[73] Assignee: Mazda Motor Corporation, Hiroshima, Japan

[21] Appl. No.: 526,706

[22] Filed: May 22, 1990

[30] Foreign Application Priority Data

May 25, 1989 [JP] Japan .................................. 1-132429

[51] Int. Cl.$^5$ .............................................. F02P 5/15
[52] U.S. Cl. ................................ 123/422; 364/431.07
[58] Field of Search ............... 123/416, 417, 418, 422, 123/423; 74/860; 364/431.05, 431.07

[56] References Cited

U.S. PATENT DOCUMENTS

| 4,164,157 | 8/1979 | Kudo et al. ............................ 74/860 |
| 4,682,577 | 7/1987 | Kato et al. ......................... 123/422 X |
| 4,870,935 | 10/1989 | Araki ..................................... 123/422 |
| 4,896,641 | 1/1990 | Nagano et al. ....................... 123/422 |
| 4,924,832 | 5/1990 | Abe ....................................... 74/860 |

FOREIGN PATENT DOCUMENTS

| 2744742 | 4/1979 | Fed. Rep. of Germany ...... 123/422 |
| 0056235 | 5/1977 | Japan ...................................... 74/860 |
| 0003173 | 1/1987 | Japan ................................... 123/422 |
| 0138164 | 6/1988 | Japan ................................... 123/422 |

Primary Examiner—Willis R. Wolfe
Attorney, Agent, or Firm—Fish & Richardson

[57] ABSTRACT

A control system for controlling spark timing of the engine is to control the retarding of the spark timing at the time of accelerating in anticipation. The amount of retarding the spark timing at the time of accelerating is set larger when the torque converter is provided in a driving system of the engine than when no torque converter is provided. A preferred feature is such that the amount of retarding the spark timing at the time of accelerating is set so as to be decreased gradually from its given initial value and that the retarding of the spark timing is suspended when the retarding amount reaches a value smaller than a given reset value. Both the initial value and the reset value are set to be greater when the torque converter is equipped than those when no torque converter is equipped.

14 Claims, 5 Drawing Sheets

CONTROL SYSTEM FOR CONTROLLING SPARK TIMING OF ENGINE

BACKGROUND OF THE INVENTION

1. Field of the Invention

The present invention relates to a control system for controlling the timing for making an electric spark in the engine of a vehicle.

2. Description of Related Art

There is the increasing tendency that engines, particularly engines for automobiles, are designed to retard the timing for sparking when the knocking of the engine is sensed by a knocking sensor.

Control of the ignition timing by using the knocking sensor is not sufficient to fully prevent the knocking because the control is implemented after the knocking has occurred. Hence, it has been proposed that the ignition timing be retarded in a predetermined amount in anticipation when a running state is sensed in which the knocking is likely to occur. Japanese Patent Unexamined Publication (Kokai) No. 138,164/1988 discloses the technique in which the ignition timing is retarded in a predetermined amount in advance at the time of acceleration when the knocking may readily occur. It is preferred that an amount of this retard be as small as possible within the range in which the knocking can be prevented, in order to impair accleration performance.

Recently, many vehicles are provided with at least a common engine and separate transmissions. In other words, it is common that the vehicle with automatic transmission loaded is distinguished from the vehicle with manual transmission loaded. It is in general that the automatic transmission is provided with a torque converter.

It has been found, however, that the vehicle with the torque converter disposed in the driving system of the engine is likely to cause knocking at the time of acceleration, as compared with the vehicle without the torque converter, when the retarding amount for the vehicle with the torque converter is set to a value which is the same as that for the vehicle with no torque converter.

As a result of review on the cause of this phenomenon, it has been found that the knocking is likely to occur because the operator has the growing tendency of depressing the accelerator pedal more by the amount of a slip of the torque converter when the operator intends to gain a feeling of acceleration to a similar extent.

SUMMARY OF THE INVENTION

Therefore, the present invention has been performed under the circumstances as described hereinabove and has the object to provide a control system for controlling the ignition timing of the engine adaptable to optimally set a retarding amount so as to comply with the presence or absence of the torque conventer, given the ignition timing being retarded in a predetermined amount at the time of accelerating.

In order to achieve the object, the present invention consists of a control system for controlling the timing for sparking the engine by retarding the timing for sparking in a predetermined amount at the time of accelerating, comprising: a judgment means for judging the presence or absence of disposition of a torque converter in a driving system of the engine; and a retarding-amount altering means for altering a retarding amount at the time of accelerating so as to be greater when the presence of disposition of the torque converter is judged by the judgement means than when the absence of disposition of the torque converter is judged by the judgment means.

With the arrangement as described hereinabove, a sufficient degree of acceleration can be ensured by setting the retarding amount of the ignition timing at the time of accelerating, necessary for a prevention of knocking, to a relatively smaller, when no torque converter is equipped. On the contrary, when the torque converter is provided, the knocking can be prevented to a sufficient extent by making the retarding amount of the ignition timing at the time of accelerating greater relative to when no torque converter is provided.

It is to be noted herein that the control system according to the present invention is extremely advantageous because it is not necessary to prepare a control unit for controlling the timing for sparking separately for the vehicle with the torque converter and for the vehicle without the torque converter. Hence, the control system according to the present invention is advantageous to have the control units used in common.

Other objects, features and advantages of the present invention will become apparent in the course of the description of the preferred embodiments which follows, in conjunction with the accompanying drawings.

DETAILED DESCRIPTION OF THE PREFERRED EMBODIMENTS

The present invention will be described more in detail in conjunction with the accompanying drawings.

Figure 1:
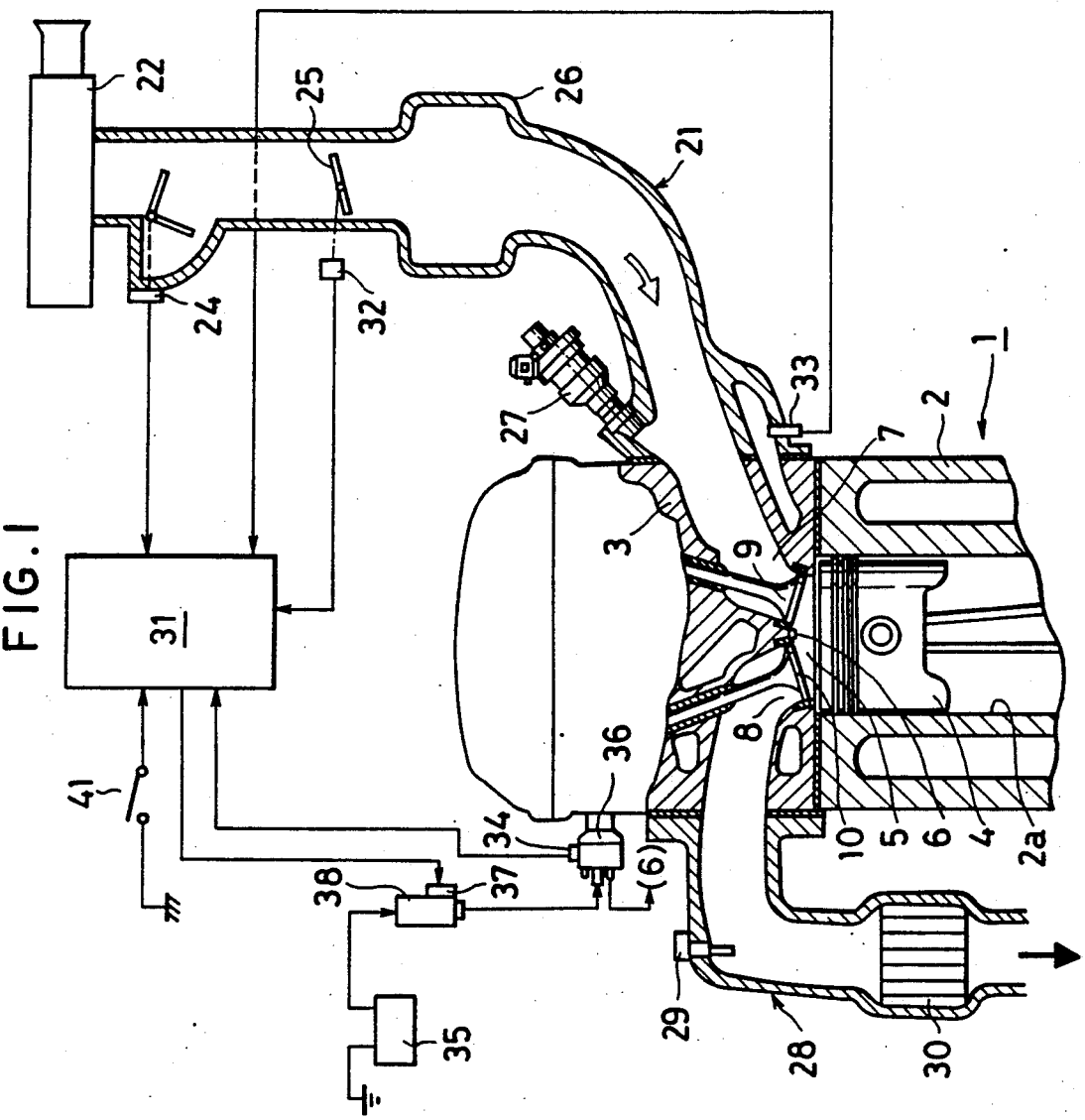
FIG. 1 is a schematic diagram in section showing a system according to an embodiment of the present invention.

As shown in FIG. 1, reference numeral 1 denotes a main body of an engine of an Otto type that the engine is of a four-cycle reciprocating type. As is known to the art, the main body 1 of the engine is provided with a combustion chamber 5 defined by a cylinder block 2, a cylinder head 3 and a piston 4 which is inserted into a cylinder 2a of the cylinder block 2. The combustion chamber 5 is provided with a spark plug 6 and has openings to an air intake port 7 and an exhaust port 8. The intake port 7 and the exhaust port 8 are arranged so as to be opened or closed by an air intake valve 9 and an exhaust valve 10, respectively, at the timing known to the art in synchronization with an output shaft of the engine.

An air intake passage 21 communicated with the air intake port 7 is provided in order from the upstream side to the downstream side with an air cleaner 22, an air-flow meter 24 for sensing an amount of intake air, a throttle valve 25, a surge tank 26, and a fuel injection valve 27. An exhaust passage 28 communicated with the exhaust port 8 is provided in order from the upstream side to the downstream side with a air-fuel sensor 29, and a three way catalyst 30 as a device for cleaning exhaust gases.

As shown in FIG. 1, reference numeral 31 denotes a control unit composed of a microcomputer, which signals enter from switches and sensors 32, 33, 34 and 41, in addition to signals from the air-flow meter 24. The switch 32 is an idle switch for detecting the full closure of the throttle valve 25. The sensor 33 is to sense the temperature of a coolant for cooling the engine. The sensor 34 is disposed at a distributor 36 and is to sense a crank angle, i.e., the number of revolutions of the engine. The switch 41 is to distinguish between automatic transmission with a torque converter and manually-operable transmission without torque converter from transmission (not shown) connected to the output shaft of the engine. More specifically, the switch 41 is a switch for connecting or disconnecting a given terminal of the control unit 31 to or from the earth. When the control system is applied to the automatic transmission with the torque converter, on the one hand, the switch 41 is closed prior to shipment from the manufacturer. When it is applied to the other transmission, on the other hand, the switch 41 is shipped from the manufacturer while it is kept open.

The control unit 31 generates a given signal to an igniter 37. In other words, as the given signal for indicating the spark timing is generated to the igniter 37 from the control unit 31, primary electric current of a spark coil 38 is blocked to thereby generate a high voltage on its secondary side and the high voltage on the secondary side is fed to a spark plug 6 through the distributor 36.

Figure 2:
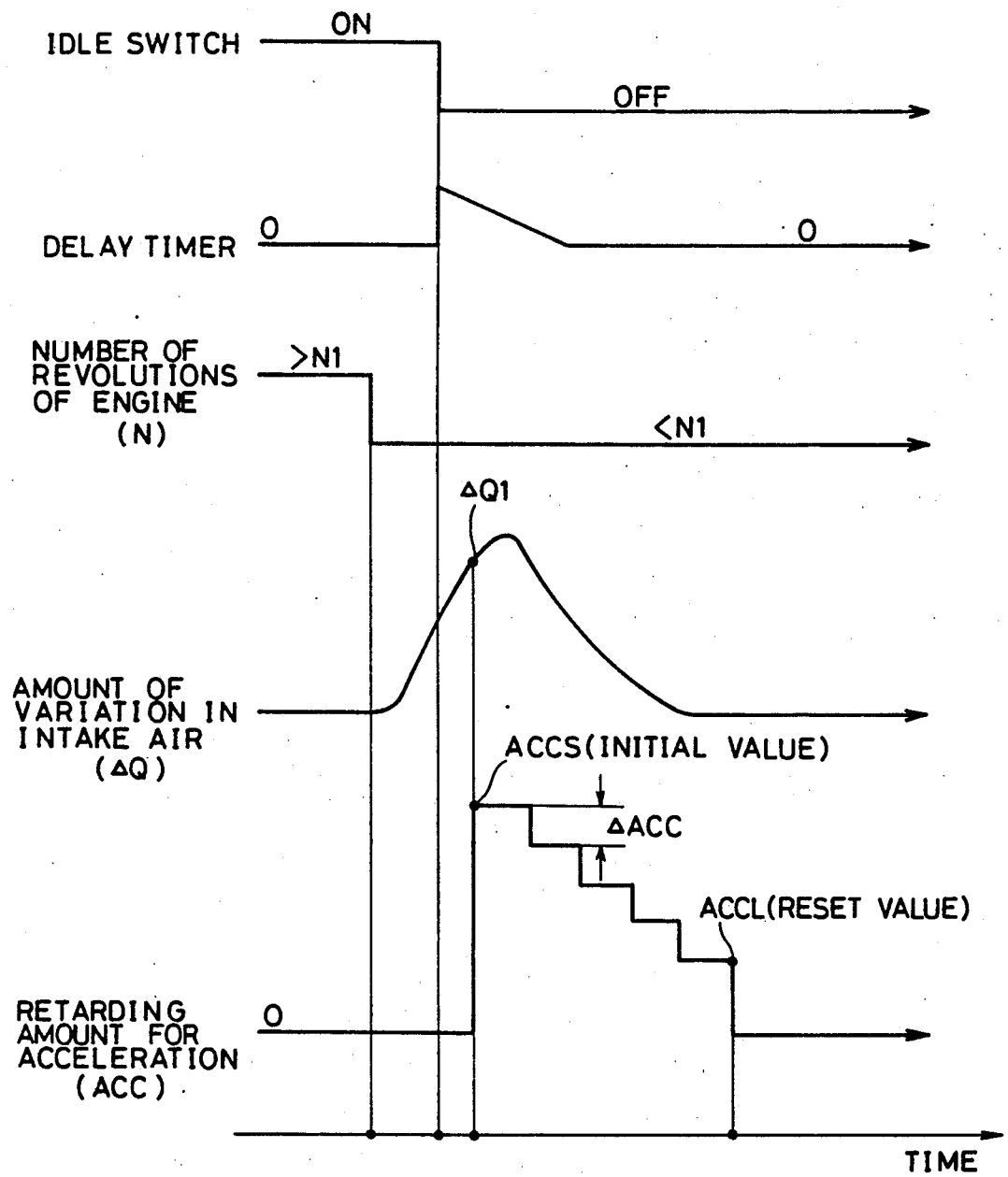
FIG. 2 is a diagrammatic representation showing a basic control content according to the present invention.

Description will be made of an outline of control by means of the control unit 31 in conjunction with FIG. 2.

When the spark timing is delayed at the time of accelerating, the retarding amount is first set to an initial value ACCS and it is decreased by a given portion, $\Delta ACC$, per each control cycle. As the retarding amount reaches a given reset value ACCL, the retard for acceleration is released, i.e., the retarding amount ACC is rest to zero.

The conditions for retarding at the time of accelerating, i.e., the conditions for setting the initial value ACCS of the retarding amount are satisfied when all the following three conditions are met.

First, the delay time is within a given time period after the point of time when the throttle valve 25 is opened from its full closed state (from the state in which the idle switch 32 is being turned on).

Second, the number of revolutions of the engine is smaller than a given value N1.

Third, the variation amount of an amount of intake air per a given time period, $\Delta Q$, was turned from the previous value smaller than a given value, $\Delta Q1$, to a current value greater than the given value, $\Delta Q1$. (Detection of acceleration).

On the contrary, the retarding at the time of accelerating can be released when either one of the reset conditions as follows is met.

First, the temperature of a coolant for the engine is lower than a given value W1.

Second, the vehicle is decelerating.

Third, the retarding amount ACC is smaller than the reset value ACCL.

Figure 3:
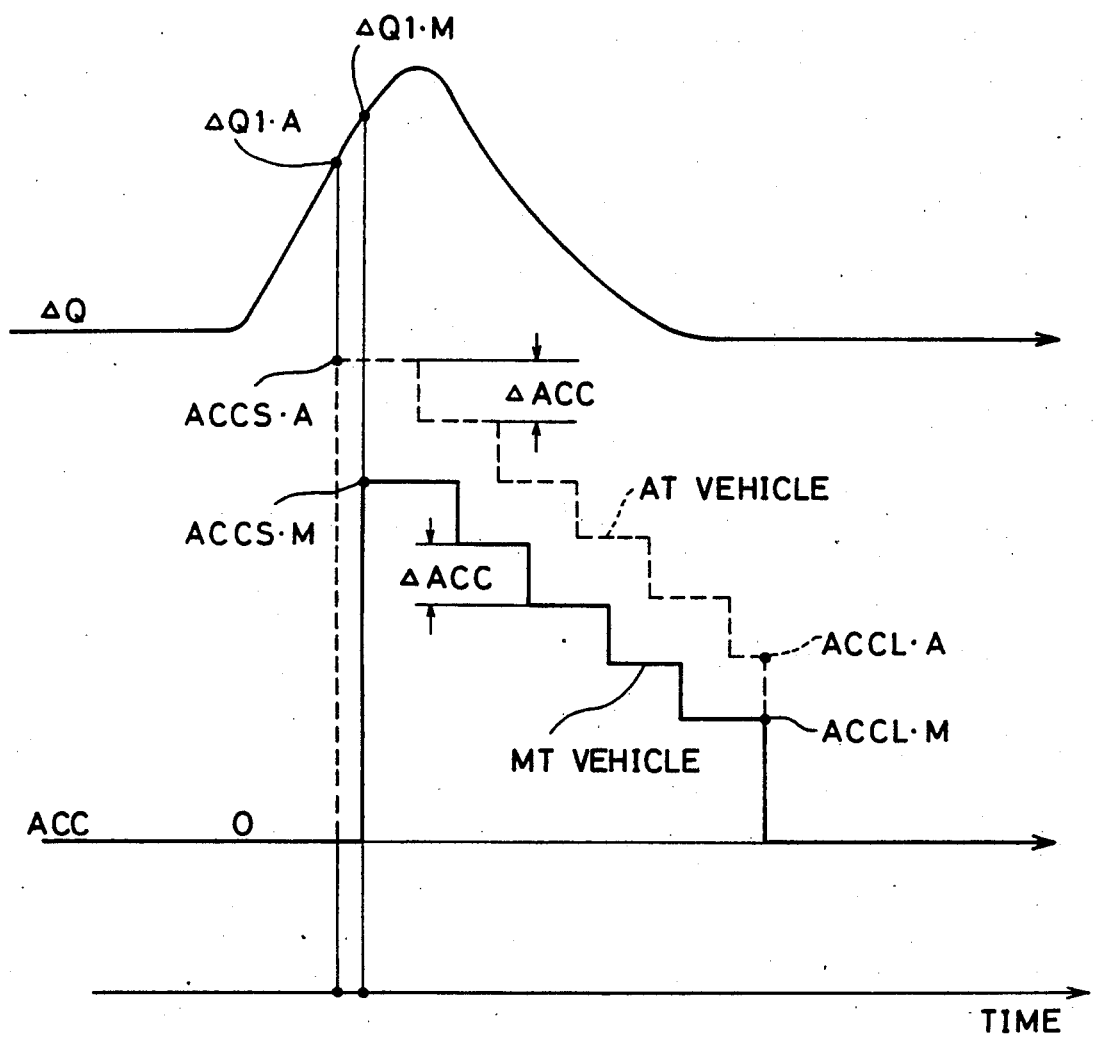
FIG. 3 is a diagrammatic representation showing the mode of the retarding amounts at the time of accelerating between the vehicle wioth the torque converter (AT vehicle) and the vehicle without torque converter (MT vehicle).

The retarding control at the time of accelerating may be altered by changing control values in three ways, as shown in FIG. 3, in accordance with the kind of the transmission, i.e., in accordance with the presence or absence of the torque converter in the driving system of the engine. Firstly, when the initial values ACCS of the retarding amount are different, the initial value ACCS.A (where A stands for automatic transmission) for the vehicle with the torque converter (AT vehicle) is set so as to be greater than the initial value ACCS.M (where M stands for manual transmission) for the vehicle without torque converter (MT vehicle) (ACCS.M < ACCS.A). Secondly, the amount of variation in the amount of intake air, $\Delta Q1$, is set such that the amount $\Delta Q1 \cdot M$ for the vehicle without torque converter (MT vehicle) is greater than the amount $\Delta Q1 \cdot A$ for the vehicle with the vehicle with the torque converter (AT vehicle) ($\Delta Q1 \cdot M > \Delta Q1 \cdot A$). Thirdly, the retarding amount for reset, ACCL, is set such that the retarding amount ACCL.A for the vehicle with the torque converter (AT vehicle) is greater than the retarding amount ACCL·M for the vehicle without torque converter (MT vehicle) (ACCL·M < ACCL·A). The control values other than the three control values described hereinabove are set to the same magnitudes regardless of the presence or absence of the torque converter.

Figure 4A:
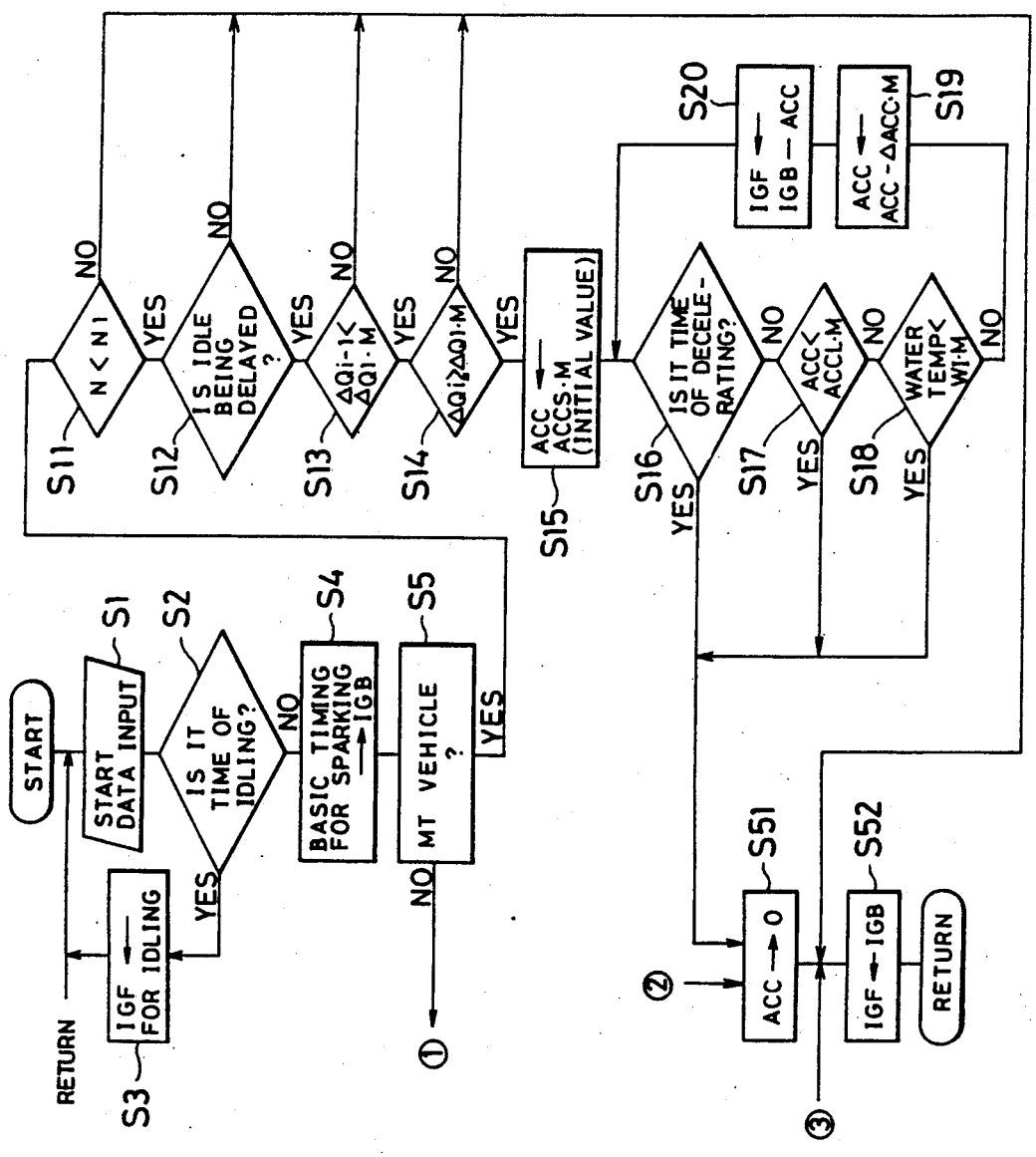
FIGS. 4A and 4B are flow charts showing control examples according to the present invention.
Figure 4B:
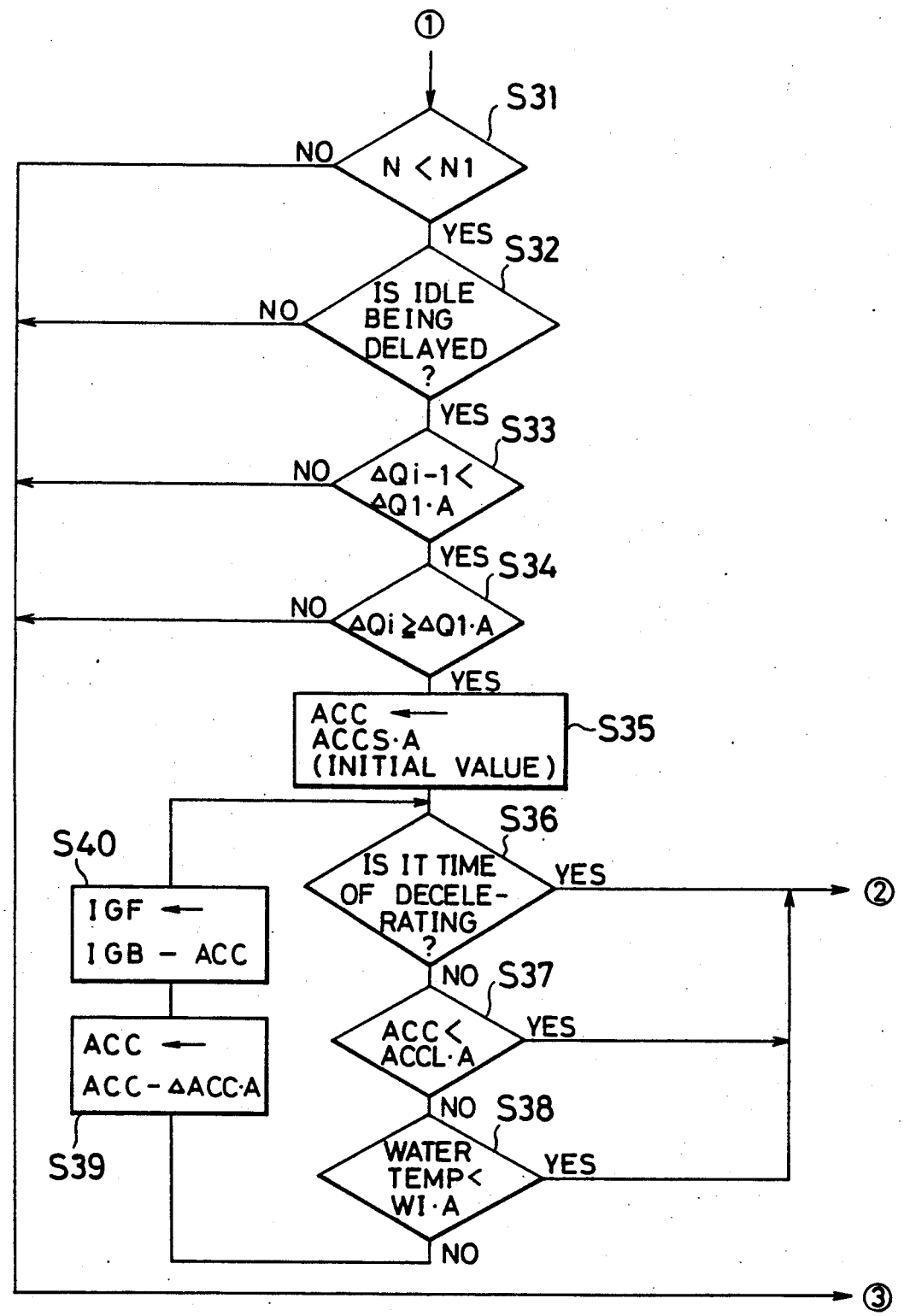

Detailed description will be made of the timing for sparking by the control unit 31 in conjunction with the flow charts as shown in FIGS. 4A and 4B.

After the signals from the switches and the sensors are read at step S1, it is judged at step S2 to see whether the vehicle is currently running in an idling state. When it is decided that the vehicle is currently running in an idling state, the flow advances to step S3 and the spark timing set evenly for idling is decided as a final spark timing IGF. The the flow is returned.

If it is decided at step S2 that the vehicle is not running currently in an idling state, then the basic spark timing IGB is decided at step S4 in such a manner as known to the art on the basis of the number of revolutions of the engine and the amount of intake air. Then at step S5, it is decided whether or not the vehicle is provided with manual transmission, or whether or not the vehicle has no torque converter. When YES in the decision process at step S5, i.e., when it is decided that the vehicle has no torque converter, the flow proceeds to step S11 and thr processing is continued thereafter. When NO in the decision process at step S5, i.e., when it is decided that the vehicle is provided with the torque converter, the flow proceeds to step S31 in FIG. 4B and then the processing is implemented thereafter. It is to be noted herein that the processing at step S11 and thereafter is substantially the same as the processing at step S31 and thereafter except for the three control values as described hereinabove. Hence, description will be omitted of portions which overlap with each other for brevity of explanation.

When it is decided at step S5 that the vehicle is loaded with the torque converter, it is then judged in the decision process from step S11 to step S14 to see whether the initial value ACCS of the retarding amount at the time of accelerating meets all the requirements for setting. When it is decided that all the conditions for setting has been satisfied, namely, the YES in all the decision process from step S11 to step S147, the retarding amount ACC is set as an initial value ACCS at step S15.

In the decision process from step S16 to step S18 after step S15, it is decided to see whether the above-described condition for releasing the retard for accelerating is satisfied. When NO in all the decision processes at steps S16 to S18, it is decided that no conditions for releasing the retard are met and, at step S19, the retarding amount ACC is decided as a value obtained by subtracting a given decrement ΔACC from the latest retarding value ACC. Then at step S20, this retarding amount ACC is subtracted from the basic spark timing IGB and this difference is decided as the final spark timing IGF.

If it is judged NO at either one of steps S11 to S14, it is decided that no retarding for acceleration is needed. In this case, the flow proceeds to step S52 and the basic spark timing IGB is set as the final spark timing IGF.

If it is judged YES in the decision at either one of steps S16 to S18, the flow proceeds to step S51 where the retarding amount ACC for accelerating is reset to zero and then the flow advances to step S52 where the processing is executed in the same manner as described hereinabove.

It is to be understood that the foregoing text and drawings relate to embodiments of the present invention given by way of examples but not limitation. Various other embodiments and modifications are possible within the spirit and scope of the present invention.

What is claimed is:

1. A control system for controlling the timing for sparking the engine by retarding spark timing in a predetermined amount at the time of acclerating, comprising:
   a judgement means for judging the presence or absence of disposition of a torque converter in a driving system of the engine; and
   a retarding-amount altering means for altering an amount for retarding the spark timing at the time of accelerating so as to be greater when the presence of disposition of the torque converter is judged by the judgement means than when the absence of disposition of the torque converter is judged by the judgment means.

2. A control system as claimed in claim 1, further comprising an alteration means for altering conditions for retarding the spark timing, wherein the alteration means alters a threshold value for judging whether the spark timing is retarded at the time of accelerating to a value, when the torque converter is equipped, smaller than a value when no torque converter is equipped.

3. A control system as claimed in claim 2, wherein the threshold value is set as a given amount of variation in engine load.

4. A control system as claimed in claim 3, wherein the given amount of variation in engine load is a given amount of variation in an amount of intake air.

5. A control system as claimed in claim 1,
   wherein an amount of retarding the spark timing at the time of accelerating is set so as to be decreased gradually from a given initial value; and
   wherein the retarding-amount altering means alters the initial value to a value when the torque converter is equipped, a value being greater than a value when no torque converter is equipped.

6. A control system as claimed in claim 1,
   wherein the amount of retarding the spark timing at the time of accelerating is set so as to be decreased gradually from a given initial value and retarding the spark timing at the time of accelerating is suspended when the amount of retarding the spark timing reaches a value smaller than a given reset value; and
   wherein the retarding-amount altering means alters the reset value to a value when the torque converter is equipped, a value being greater than a value when no torque converter is equipped.

7. A control system as claimed in claim 1,
   wherein the amount of retarding the spark timing at the time of accelerating is set so as to be decreased gradually from a given initial value; and
   wherein the amount of retarding the spark timing from the given initial value is decreased at a rate, when the torque converter is equipped, which is identical to that when no torque converter is equipped.

8. A control system as claimed in claim 1,
   wherein the amount of retarding the spark timing at the time of accelerating is set so as to be decreased gradually from a given initial value and retarding the spark timing at the time of accelerating is suspended when the amount of retarding the spark timing reaches a value smaller than a given reset value; and
   wherein the retarding-amount altering means alters the initial value to a value when the torque converter is equipped, a value being greater than a value when no torque converter is equipped and the retarding-amount altering means alters the reset value to a value when the torque converter is equipped, a value being greater than a value when no torque converter is equipped.

9. A control system as claimed in claim 8, further comprising an alteration means for altering conditions for retarding the spark timing, wherein the alteration means alters a threshold value for judging whether the spark timing is retarded at the time of accelerating to a value, when the torque converter is equipped, smaller than a value then no torque converter is equipped, smaller than a value when no torque converter is equipped.

10. A control system as claimed in claim 1, wherein a condition for starting the retarding of the spark timing at the time of accelerating is set such that, within a given time period from a point of time when a throttle valve starts opening from a state in which the throttle valve is closed, the number of revolutions of the engine reaches a value which is smaller than a given number of revolutions and an amount of variation in engine load is changed to an amount which is greater than a given threshold value from an amount which is smaller than the given threshold value.

11. A control system as claimed in claim 1, wherein the amount of retarding the spark timing at the time of accelerating is set so as to be decreased gradually from a given initial value and retarding the spark timing at the time of accelerating is suspended when the amount of retarding the spark timing reaches a value smaller than a given reset value.

12. A control system as claimed in claim 1, wherein the retarding of the spark timing is suspended when a temperature of a coolant of the engine reaches a temperature which is lower than a given temperature.

13. A control system as claimed in claim 1, wherein the retarding of the spark timing is suspended when deceleration of the engine is detected.

14. A control system as claimed in claim 1,
   wherein the amount of retarding the spark timing at the time of accelerating is set so as to be decreased gradually from a given initial value; and
   wherein retarding the spark timing at the time of accelerating is suspended when either one of three conditions is met, a first condition being such that the amount of retarding the spark timing reaches a value which is smaller than a given reset value; a second condition being such that a temperature of a coolant of the engine reaches a temperature which is lower than a given temperature; and a third condition being such that deceleration of the engine is detected.

* * * * *